May 18, 1948. G. W. TRAVER 2,441,778
LINER FOR PRODUCE CONTAINERS
Filed July 10, 1943
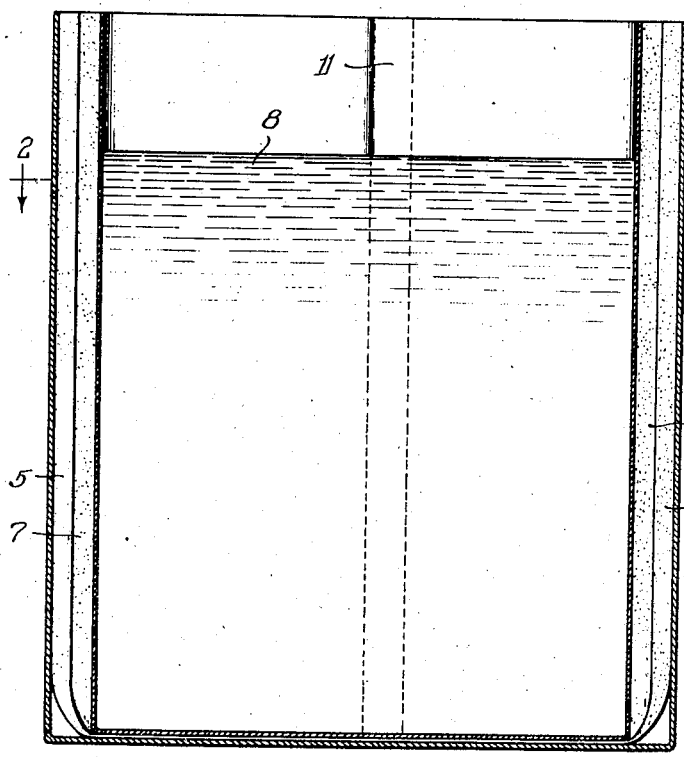
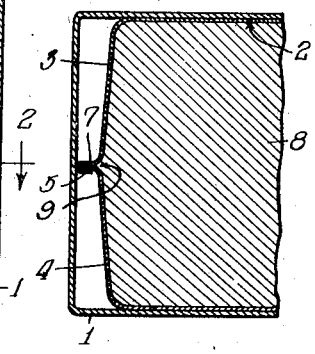
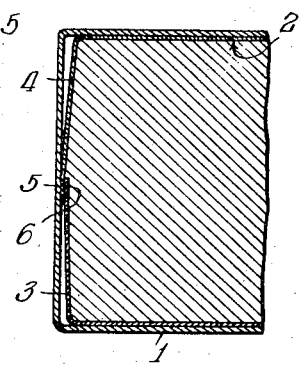
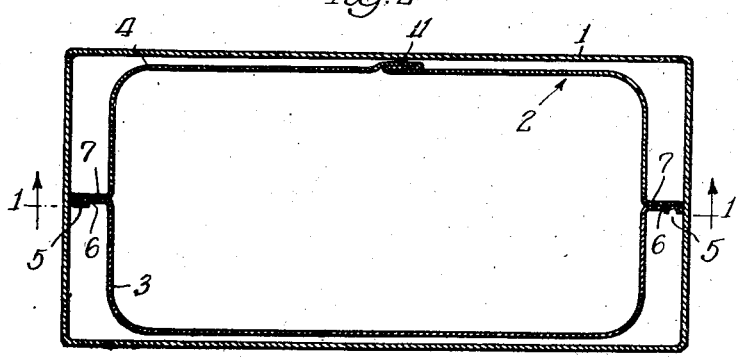
INVENTOR.
George W. Traver,
BY Patented May 18, 1948

2,441,778

UNITED STATES PATENT OFFICE 2,441,778

LINER FOR PRODUCE CONTAINERS

George W. Traver, Chicago, Ill., assignor to Traver Corporation, Chicago, Ill.

Application July 10, 1943, Serial No. 494,130

5 Claims. (Cl. 229—14)

This invention relates to means for lining containers for frozen produce, and has for its principal object the provision of a new and improved liner of this type.

It is a main object of the invention to provide a liner for a container for frozen produce that is in the form of a bag, and is composed of moisture proofed material of such a nature that it does not contaminate the produce with which it comes in contact.

Another object of the invention is to provide a liner which is capable of expanding under the force of expansion of the produce on freezing.

Still another object of the invention is to provide a durable liner for containers for frozen produce which may be readily manufactured at low cost.

Further objects of the invention, not specifically mentioned here, will be apparent from the detailed description and claims which follow, reference being had to the accompanying drawings in which a preferred embodiment is shown by way of example, and in which Figure 1 is a cross-sectional view of a liner placed in a container, and taken substantially along the plane 1—1 of Figure 2 looking in the direction of the arrows;

Figure 2 is a cross-sectional view taken substantially along the line 2—2 of Figure 1 looking in the direction of the arrows;

Figure 3 is a fragmentary cross-sectional view similar to Figure 2, and showing a liner at an intermediate stage of its expansion; and Figure 4 is a view similar to Figure 3, showing the liner completely expanded.

Edible produce, such as eggs, for example, are frequently quick frozen and stored in a frozen condition to preserve them. Heretofore it has been the practice to break the eggs into a suitable metal container, in which the eggs are frozen and stored, but owing to the shortage of metals, the industry has been forced to substitute for these metal containers preferably with non-critical materials.

Paper containers, composed either of corrugated paper or solid cardboard, lend themselves readily as a substitute for metal containers for this purpose. However, in the case of eggs and other produce which, in its non-frozen state, is liquid or semi-liquid, the container must be treated to make it wet proof, or lined with means for protecting it from the produce. There are many preparations, such as wax, for moisture proofing paper and cardboard. However, it is preferable to use other means for protecting the container from the produce and the produce from the container.

I have found that lining the container with a bag-like liner composed of a non-hygroscopic material, such as moisture proof Cellophane, produces very satisfactory results, and that such liners can be fabricated at a cost low enough to make their use highly practical.

As is well understood by those skilled in the art, most articles expand on freezing, and it has been found that the liners may be broken by the expansion of the produce contained in them as the produce is frozen.

The present invention relates to an improved liner for a use of this kind, which liner is arranged to expand sufficiently to prevent the liner from being torn or damaged under the force of expansion of the produce contained in it on freezing.

In a preferred embodiment of the invention, the liner is composed of so-called heat sealing Cellophane, and is made in the form of a bag which fits loosely within the container, and is provided with one or more auxiliary seals formed as pleats that extend outwardly from the bag, and extend from top to bottom thereof. Produce, such as eggs, is placed within the container and liner, the weight thereof forcing the liner outwardly into engagement with the inner walls of the container. The seals in the liner are made strong enough to withstand the pressures placed upon them by the weight of the produce, and are not disturbed by this initial movement of the liner. After the desired quantity of produce is thus placed in the container, the liner is sealed in any approved manner, such as by heat sealing, care being taken to allow some slack in the liner above the produce. The container, liner and produce are then placed in a freezing compartment to quick freeze the produce to a solid condition.

As the produce begins to expand on freezing, the auxiliary seals of the liner are torn apart, thereby enabling the liner to expand. This tearing apart of the seals does not injure the bag, and by providing the bag with a sufficient number of these seals, ample expansion to compensate for the expansion of the produce can easily be provided.

Referring now to the drawings in more detail, the container 1, shown as a rectangular box-like container, may be composed of either plain or corrugated board, and is of dimensions best suited to the purpose for which it is put. In one example, the container is of such dimension as to enable it to hold thirty pounds of eggs. While the container 1 is shown as a rectangular box having straight sides, other well-known types of containers may be employed, which containers may have either straight or tapered side walls as desired.

Within the box 1 is a liner 2, preferably formed of heat sealing Cellophane of suitable thickness, and comprising a front face member 3, and a back face member 4, which members are joined together by turning the edge section 5 of the member 4 through 180 degrees and over the edge 6 of the other member 3. A seam is formed in any approved manner, such as by heat sealing, to secure the folded-over portion 5 to both surfaces of the edge portion 6 and the other member. Adjacent to these seams so formed is a band-like auxiliary seal 7, located between the seam and the interior of the bag, forming with the seam a lip-like projection or pleat on the bag, as will be best seen in Figure 2. Seal 7, which extends on the two sides of the bag and across the bottom end of it in one instance, is approximately one-quarter of an inch wide.

The liner thus formed is placed within the container 1 and the produce 8 placed within the liner. Seals 7 are strong enough to resist being torn apart by the weight of the produce within the liner. It will be understood, of course, that the weight of the produce will force the liner out into engagement with the interior walls of the container, and that the seams will not remain outstanding from the liner, as shown in Figure 2, this figure being made diagrammatic in this regard, the better to illustrate the principle involved.

After the desired quantity of produce has been placed within the container, filling it to approximately the level shown in Figure 1, the liner is sealed at the top in any approved manner, such as by forming a heat-seal thereacross, and the container closed in any approved manner. In closing the bag-like liner, preferably a considerable space is left between the top surface of the produce and the seal, sealing into the bag a small quantity of air above the produce. The container is then placed in a freezing chamber to quickly freeze the produce to a solid condition.

As the produce freezes and begins to expand, the seals 7, being subjected to tearing strains by the expansion of the produce 8, separate from the inner edge outwardly, as shown at 9, Figure 3. The perimeter of the liner is increased by this tearing of its seal 7. For example: If the seal 7 is one-quarter of an inch wide, and a seam formed by folding the edge 5 of the one member over the edge 6 of the other is likewise one-quarter of an inch, the pleat-like seam and seal outstanding from the container, as shown in Figure 2, will be approximately one-half of an inch wide, and when the seal is completely torn apart, as shown in Figure 4, the perimeter of the liner 2 will be increased one inch.

In the embodiment shown in the drawings, two seam and seal combinations are shown, so the perimeter of the liner may be increased by as much as two inches. Ordinarily this amount of expansion will be sufficient, and it is preferable to have the seals 7 adjacent to the seams to permit forming the seals and seams simultaneously during the manufacture of the liner.

In the event that it is desirable to have more expansion than can be conveniently supplied by the two seam and seal combinations, additional expansion can be achieved by folding a pleat 11 in one or both of the face members 3 and 4 of the liner, and heat-sealing the pleat to form an auxiliary seal. This auxiliary seal will be torn apart by the force of the expansion of the produce, and by providing a sufficient number of such pleats, any desired amount of expansion can be handled by the liner.

While heat-sealing Cellophane is the preferred material for forming the liners of the present invention, and heat sealing is preferred as a means for fastening together the various parts of the liner, the use of other materials and other means of fastening is contemplated. As shown in the drawings, the liner is composed of a single thickness of material, and in most instances this will suffice. In certain cases where an exceptionally strong liner is required, laminated material may be used within the teachings of the invention.

Throughout the preceding specification, I have referred to freezing and expansion of the produce upon freezing, and while the present invention lends itself particularly well to such conditions, it is not to be limited thereto. Freezing may be defined as a change from liquid to solid state, and herein the term is broadly used. Certain products, lard for example, are frequently packed in a liquid state and allowed to solidify within the container, and use of the present invention under these conditions is contemplated.

From the foregoing it will be apparent that the bag-like liner of the present invention is possessed of many advantages. It may be composed of comparatively inexpensive Cellophane or other similar material, having thickness and strength dictated by the demands placed upon it. In cases where large containers are desirable, the liner may be composed of two or more thicknesses of material to form a laminated liner. Expansion being amply provided for by one or more auxiliary seals disposed either adjacent to the seams in the liner or elsewhere, the liner may be used in connection with articles of produce which have high co-efficient of expansion on freezing. The liner may be used in connection with cardboard containers, as shown by way of example, or in connection with containers composed of other materials, including metals. The liner, being inexpensive, can be used once and then discarded.

While I have chosen to illustrate my invention by showing and describing a preferred embodiment of it, I have done so by way of example only, as there are many modifications and adaptations which can be made by one skilled in the art within the teachings of the invention.

Having thus complied with the statutes, and shown and described a preferred embodiment of my invention, what I consider new and desire to have protected by Letters Patent is pointed out in the appended claims.

What is claimed is:

1. In a bag, a front member and a back member, one of said members being wider and longer than the other member and being folded over and permanently fixed to outer face of said other member to form permanent seams fixing the members together, and auxiliary breakable seals located adjacent to said permanent seams and breakably holding the adjacent faces of said members together along bands adjacent to said permanent seams.

2. A bag comprising, front and back face members composed of heat-sealing Cellophane, permanent seams joining together said members along two sides and one end thereof, said permanent seams being formed by folding one of said members over the edges of the other and heat sealing the folded portion of the one member to the outer face of the other member, and secondary breakable seams joining the inner faces of said members together along bands adjacent to said side seams, said secondary seams resisting forces set up by the weight of the material in the bag and yielding under the strain set up by expansion of the material.

3. A bag comprising, a first and second sheet-like member, the first of said members being folded over the edges of the second member, means permanently securing the folded over portion of the first member to the outer face of the embraced portion of the second member to form seams securing the two members together to form a bag, and means breakably securing the adjacent inner faces of said members together along bands adjacent to said seams and between the seams and the interior of the bag to provide for expansion of the bag.

4. A package in which is combined an outer container and therewithin a liner forming an enclosure in surrounding relation to the material therein, the liner being loosely fitted within the container with capacity for lying closely at every point against the walls thereof without distention, the liner being formed of a vapor-impermeable thin flexible sheet having an expansible wide sealed seam extending along two of its walls, said seam being fin-like and formed by bringing the edges of the sheet together in a face contacting, vapor-impermeable seal, a portion of the seal being broken and the seam reduced in width during expansion of the seam by the material.

5. In a bag, a front and a back sheet-like wall member, the first of said members being folded over the edge of the second member to embrace the same and form a seam joining the members, means permanently securing the folded-over portion of the first member to the outer face of the embraced portion of the second member, and a breakable seal securing together the adjacent inner faces of said members along a band adjacent to said seam and between the seam and the interior of the bag to provide for expansion of the bag.

GEORGE W. TRAVER.

REFERENCES CITED

The following references are of record in the file of this patent:

UNITED STATES PATENTS

| Number | Name | Date |
|---|---|---|
| 1,108,540 | Ahlquist | Aug. 25, 1914 |
| 2,062,278 | Vogt | Nov. 24, 1936 |
| 2,114,622 | Bergstein | Apr. 19, 1938 |
| 2,161,071 | McGrath et al. | June 6, 1939 |
| 2,283,069 | Knuetter | May 12, 1942 |
| 2,298,419 | Salfisberg | Oct. 13, 1942 |
| 2,342,158 | Moore | Feb. 22, 1944 |
| 2,380,427 | Gilfillan | July 31, 1945 |

FOREIGN PATENTS

| Number | Country | Date |
|---|---|---|
| 114,197 | Australia | 1941 |
| 733,896 | France | 1932 |